J. RAU.
MACHINE FOR MAKING HOLLOW GLASSWARE.
APPLICATION FILED OCT. 23, 1911.
1,066,654.
Patented July 8, 1913.
3 SHEETS—SHEET 1.
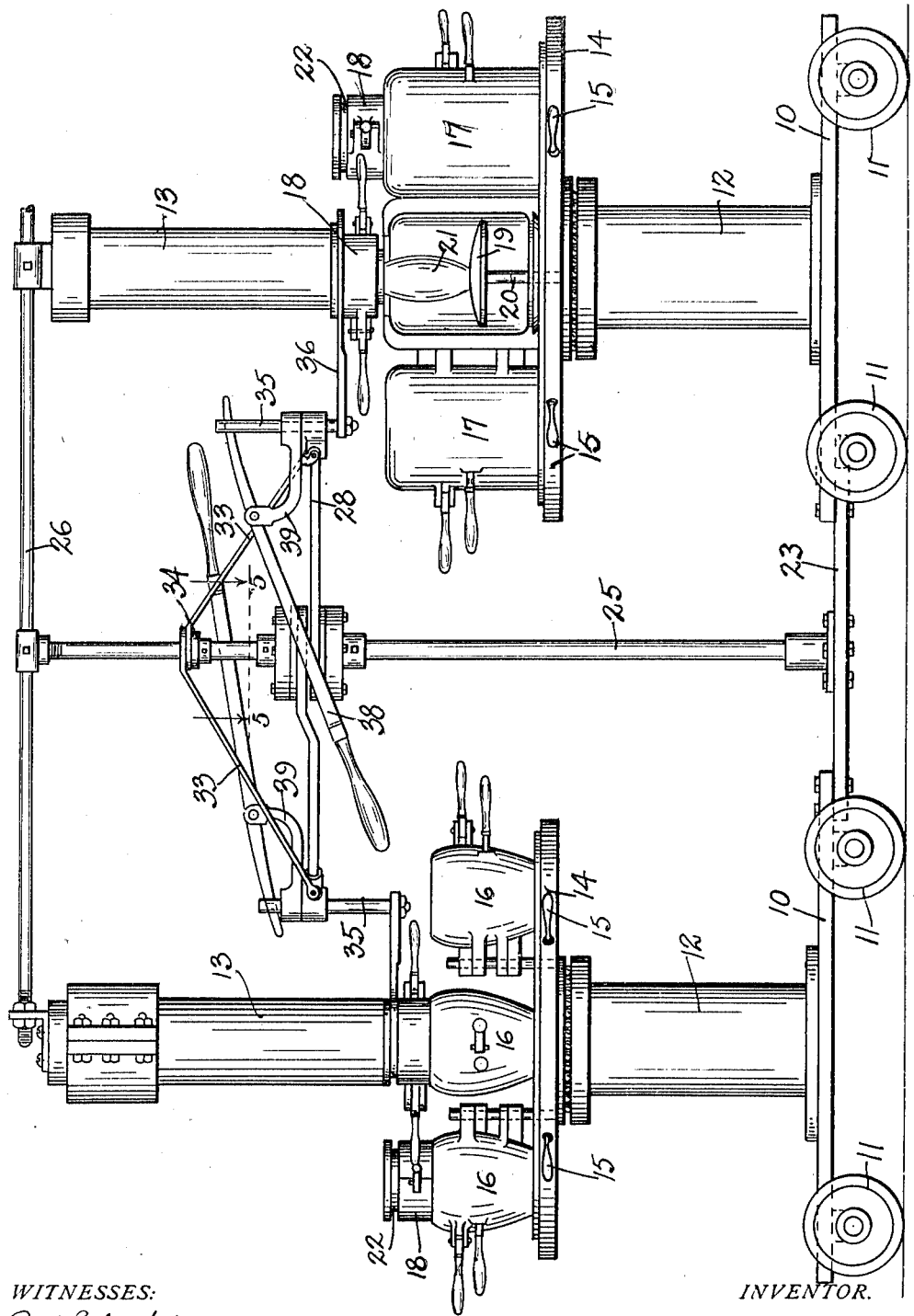
WITNESSES:
A. H. Edgerton.
O. M. McLaughlin
INVENTOR.
John Rau
BY
V. H. Lockwood
ATTORNEY.

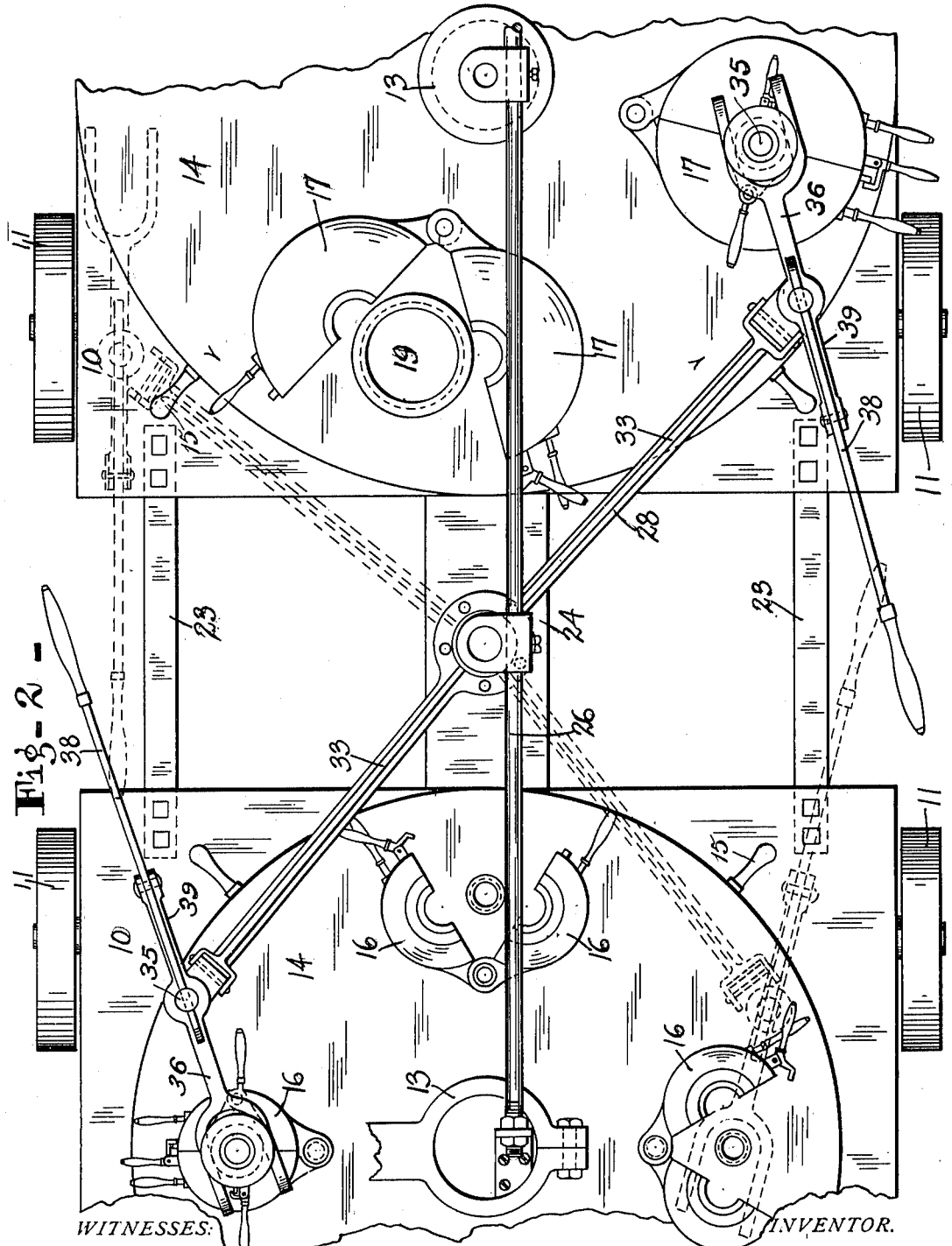

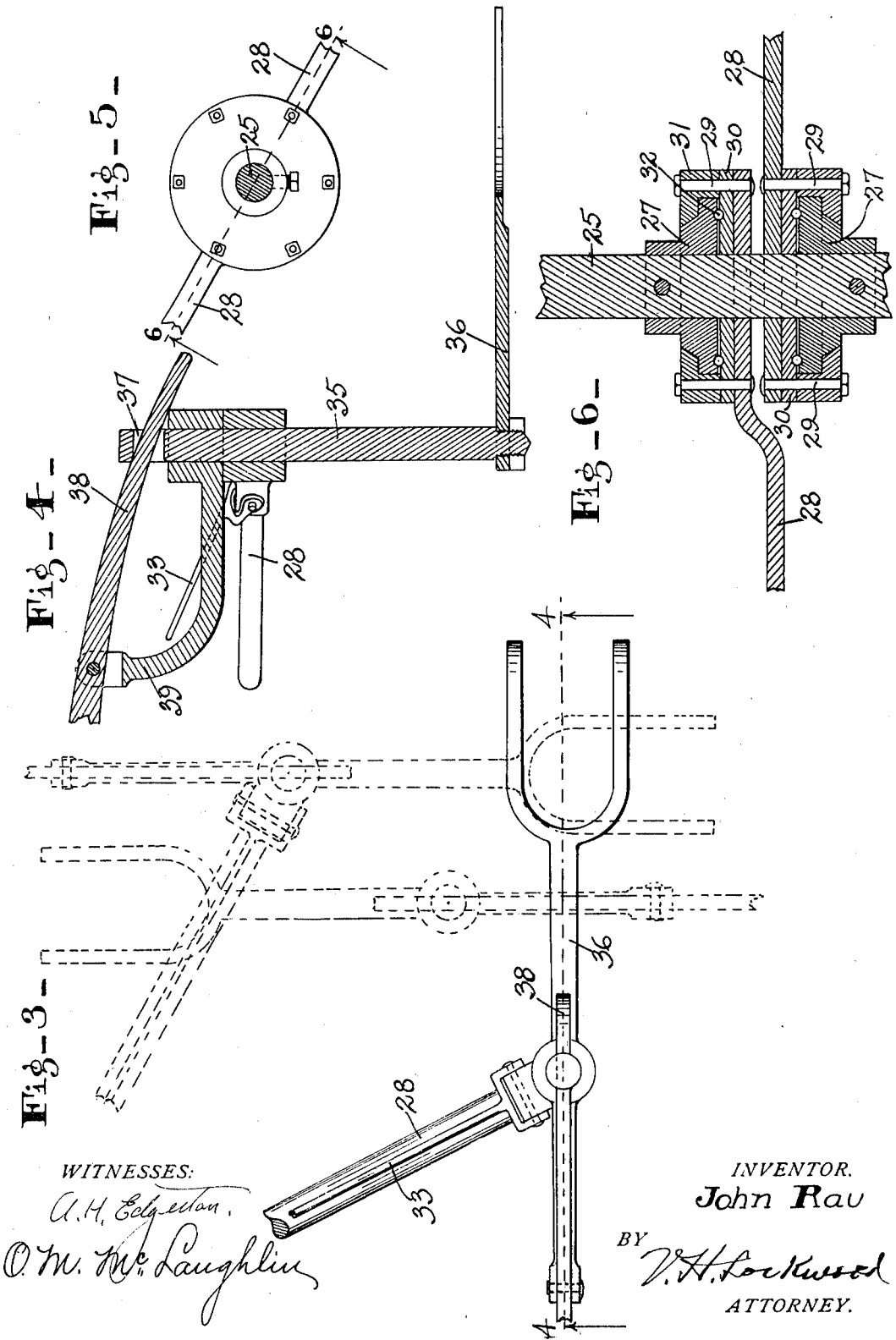

UNITED STATES PATENT OFFICE.

JOHN RAU, OF INDIANAPOLIS, INDIANA.

MACHINE FOR MAKING HOLLOW GLASSWARE.

1,066,654. Specification of Letters Patent. Patented July 8, 1913.

Application filed October 23, 1911. Serial No. 656,287.

*To all whom it may concern:*

Be it known that I, JOHN RAU, a citizen of the United States, and a resident of Indianapolis, county of Marion, and State of Indiana, have invented a certain useful Machine for Making Hollow Glassware; and I do hereby declare that the following is a full, clear, and exact description thereof, reference being had to the accompanying drawings.

The object of this invention is to provide improved machinery for making very large bottles, jars, demijohns and carboys.

So far as I am aware, heretofore machines have not been able to make glass bottles or jars of more than one gallon capacity. This machine makes bottles of five, ten and fifteen gallons capacity.

The particular feature of the machine which is herein explained relates to the means for conveying the lift-over from the blank pressing machine to the blowing machine.

The nature of the invention will be understood from the accompanying drawings and the following description of the claims.

In the drawings Figure 1 is a front elevation of the entire apparatus. The details of the blank pressing and glass blowing machines being largely omitted and showing the lift-over arms in position after having transferred the lift-over from the blow mold machine to the blank pressing machine. Fig. 2 is a plan view of the same. Fig. 3 is a plan view of the outer portion of a lift-over arm and brace and pick-up fork, two other possible positions of said parts being indicated by dotted lines. Fig. 4 is a vertical section on the line 4—4 of Fig. 3. Fig. 5 is a section on the line 5—5 of Fig. 1. Fig. 6 is a section on line 6—6 of Fig. 5 showing the means for mounting the inner ends of the pick-up arms.

There is shown on the drawings hereof a blank pressing machine at the left hand end of Fig. 1, a glass blowing machine at the right hand end of Fig. 1 and means intermediate and secured to said two machines for transferring the lift-over and blank from former to the latter machine and returning the lift-over from the latter machine to the former machine. In both the pressing machine and the glass blowing machine there is a platform 10 carried by wheels 11 and on which there is secured a tubular stand 12 in which the lower end of the column 13 is mounted. A mold table 14 is mounted on the stand 12 so as to be rotatable by hand and for that purpose has handles 15. Press molds 16 and blow molds 17 are mounted respectively on the tables 14 of the two machines and in connection with said molds lift-overs 18 are employed. There is nothing necessarily novel about the press molds. The blow molds, however, herein shown differ from the blow molds usually employed in glass blowing machinery, as they are bottomless molds and each is provided with a movable bottom 19 carried on a rod 20, and suitable means are provided for controlling the vertical movement of this bottom which, however, is not here shown, the purpose of means being to elevate the movable bottom in a mold into position to receive the lower end of a glass blank 21 when it is inserted into the blow mold. Both the blow molds and the press molds are formed of halves hinged together as usual and provided with the usual locking means. The lift-over 18 is of the usual construction excepting that each is provided with an annular recess 22 near its upper end. Each has the usual handles and locking means. The particular construction of the molds and lift-overs are immaterial in this invention, excepting that the lift-overs must have the groove 22 or its equivalent.

Bars 23 and 24 connect the adjacent ends on the platforms 10 and are secured to them and the bar 24 supports a vertical stand 25 about midway between the blank pressing and blowing machines. The upper end of this stand 25 is secured to a cross bar 26 which in turn is secured rigidly to the upper ends of the columns 13 of the two machines, hence the two machines with the parts 24, 25, and 26 constitute a rigid frame for the purpose of maintaining the exact relative positions between the blank molds, the blow molds and the means carried on the stand 25 for transferring the lift-overs from one kind of molds to the other kind.

Referring to Fig. 6 a pair of supporting disks or members 27 are secured upon the stand 25 one above the other and spaced apart and are stationary. In connection with the supporting disks 27 lift-over arms 28 are mounted on the stand 25 at their ends so as to be oscillatory horizontally. The inner end of each arm 28 is secured by bolts 29 to plates 30 and overhanging rings 31 which overlap each of the supporting disks 27 and have a bearing thereon. Balls 32 are located between the parts 27 and 30. There are preferably two arms 28, one projecting on each side of the total machine. See Fig. 2. Therefore, either arm can be laterally shifted from a position over the table of one machine to a position over the table of the other machine. The outer ends of these arms 28 are supported by the braces 33 which are pivotally mounted on the stand 25 above the collar 34. In the outer ends of the arms 28 a shift rod 35 is mounted so as to be vertically reciprocable and at their lower ends said shifts are secured to lift-forks 36 which are adapted to engage the grooves 22 in the lift-overs 18 and support said lift-overs while they are being transferred from one kind of molds to the other. The rods 35 have slots 37 in their upper ends through which one of the ends of the levers 38 project. There is one lever 38 for each arm 28 and it is fulcrumed between its ends on the fulcrum arm 39 which is loosely mounted on the rod 35 above the arm 28. The slot 37 is narrow so that the lever 38 will turn the rod 35.

In operation the glass blank is first pressed in one of the press molds 16 and one of the lift-forks 36 is moved by a lever 38 so as to engage the lift-over supporting said blank, the press mold is opened and then the arm 28 carrying said lift-fork is swung around by the said lever 38 so as to transfer said lift-over and blank into a blow mold as shown in Fig. 1. The lift-up fork and blank during this transference are elevated and lowered as required to bring them into proper positions. A reverse operation transfers the lift-over back from the blow mold to the press mold.

I claim as my invention:

1. Machinery for making hollow glassware including a horizontally oscillatory arm, a rod vertically reciprocable in the outer end of the said arm a lift-fork on said rod, a hand lever engaging said rod for elevating and oscillating the same, and means for fulcruming said lever between its ends in connection with said arm for oscillating the arm and operating said rod and lift-fork.

2. Machinery for making hollow glassware including a vertical stand, an arm mounted on said stand so as to be horizontally oscillatable, a brace oscillatable on said stand and connected with the outer end of said arm, a rod vertically reciprocable in the outer end of said arm, a lift-fork secured in the lower end of said rod, a hand lever with one end engaged with said rod for lifting and oscillating it, and a fulcrum for said lever loosely mounted on said rod and resting upon the outer end of said arm.

In witness whereof, I have hereunto affixed my signature in the presence of the witnesses herein named.

JOHN RAU.

Witnesses:
  E. H. MAYO,
  J. H. WELLS.